United States Patent [19]
Reid

[11] Patent Number: 4,593,575
[45] Date of Patent: Jun. 10, 1986

[54] MOTOR ROTATING APPARATUS

[76] Inventor: Philip L. Reid, Rte. 2, Box 422, Duncan, S.C. 29334

[21] Appl. No.: 691,662

[22] Filed: Jan. 15, 1985

[51] Int. Cl.⁴ .................. F16H 1/12; F16H 1/20; F16H 15/00; B23Q 3/00
[52] U.S. Cl. .................. 74/421 A; 74/202; 29/464
[58] Field of Search .......... 74/202, 205, 421 A, 74/411; 464/61, 65; 403/359, 11, 12; 29/464

[56] References Cited

U.S. PATENT DOCUMENTS

| | | | |
|---|---|---|---|
| 1,359,422 | 11/1920 | Percin | 74/205 |
| 1,580,817 | 8/1925 | Karge | 464/61 |
| 2,950,635 | 8/1960 | Bieger et al. | 74/421 A |
| 3,720,112 | 3/1973 | Enters et al. | 74/202 |
| 3,725,993 | 4/1973 | Siler | 29/464 |

Primary Examiner—Lawrence J. Staab
Assistant Examiner—Michael D. Bednarek
Attorney, Agent, or Firm—Bailey & Hardaway

[57] ABSTRACT

A motor rotating apparatus having a rotable shaft within a housing comprising means within the housing for receiving the output shaft of an electrical motor in communication with the rotable shaft, and means manually engageable on the exterior of said housing for selective rotational engagement with the means for receiving the output shaft of the motor.

5 Claims, 3 Drawing Figures

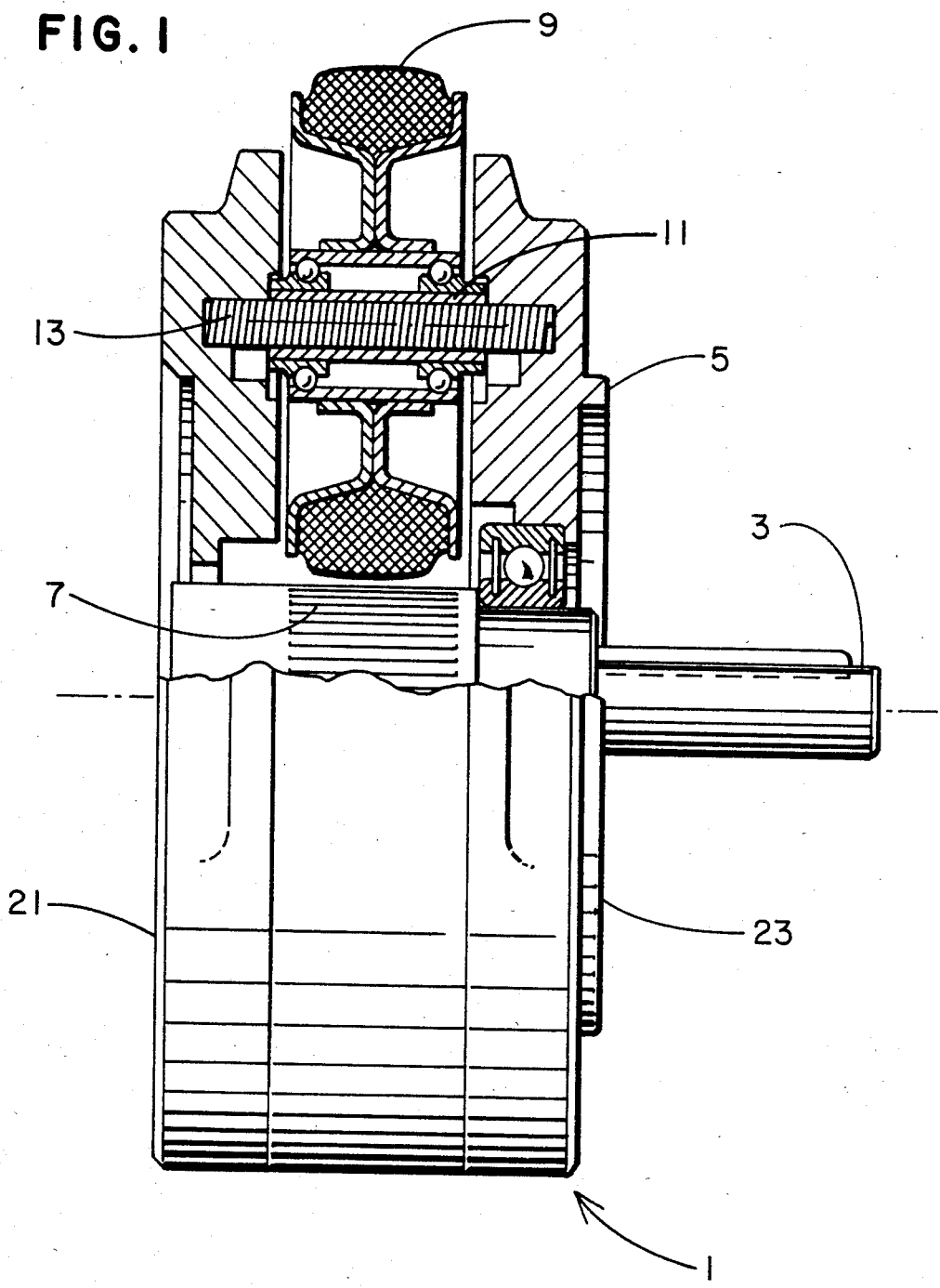

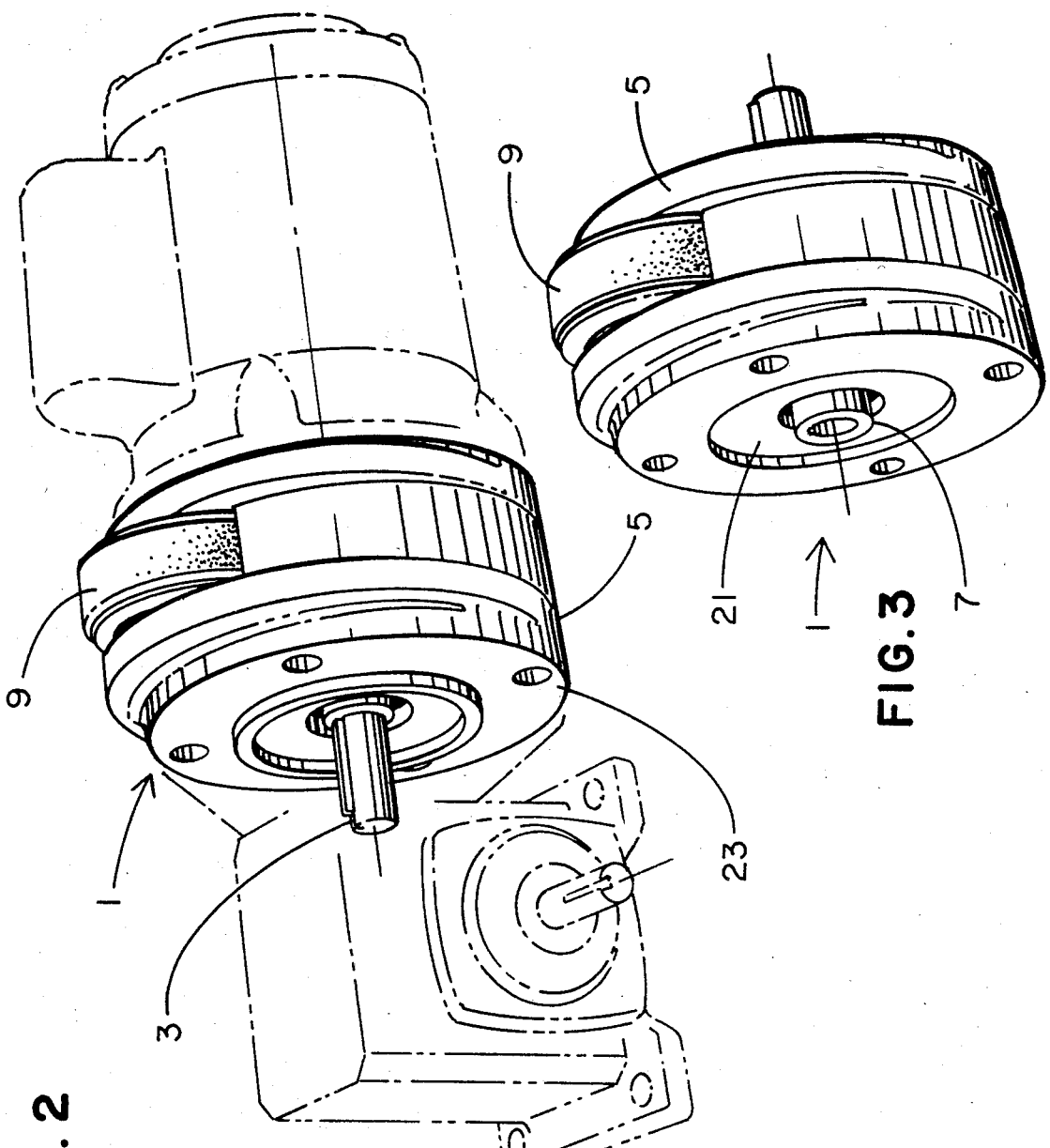

MOTOR ROTATING APPARATUS

BACKGROUND OF THE INVENTION

This invention relates generally to the art of electrical motors and more particularly to the art of manual alignment of electrical motors and their associated working mechanisms.

A problem frequently encountered with the utilization of conventional electrical motors in combination with gearboxes and other devices is the need from time to time to arrive at a precise alignment of the motor and its associated working parts. Most frequently such alignment is brought about as a nature of the working mechanism associated with an electrical motor. Most electrical motors conform to the standards set forth by the National Electrical Manufacturers Association so that producers of working mechanism can design such mechanisms to conform to a standard motor. Such motors normally have a C-faced configuration to mate with a conforming section of the working mechanism.

The alignment problem most frequently occurs when it is required to precisely align a portion of the working mechanism. Previously such alignment has been brought about by a hit or miss actuation and deactuation of the electrical motor or by the utilization of complex auxiliary mechanical equipment.

SUMMARY OF THE INVENTION

It is thus an object of this invention to provide an apparatus permitting manual rotation of an electrical motor and hence any combined mechanism output shaft.

It is a further and more particular object of this invention to provide such an apparatus which may be made integral with the motor or gearbox or as an auxiliary adapter for a motor for placement between the motor and its working mechanism such as a conforming gearbox or made integral with gearbox.

These as well as other objects are accomplished by a motor rotating apparatus having a rotatable shaft within a housing, means within the housing for receiving the output shaft of an electrical motor in communication with the rotatable shaft, and means manually engageable on the exterior of said housing for selective rotational engagement with the means for receiving the output shaft of the motor.

BRIEF DESCRIPTION OF THE DRAWINGS

FIG. 1 of the drawings illustrates a partial cutaway view of the apparatus of this invention.

FIG. 2 of the drawings is a perspective view of the right or shaft-side of the FIG. 1 view.

FIG. 3 of the drawings is a perspective drawing of a view of the left or receiving-side of the FIG. 1 view.

DETAILED DESCRIPTION

In accordance with this invention it has been found that a electrical motor and its associated working mechanism may be easily and manually aligned by association therewith of the apparatus of this invention. Various other advantages and features will become apparent from the following description given with reference to the various figures of drawing.

FIG. 1 of the drawings illustrates the apparatus 1 in accordance with this invention. The apparatus comprises a shaft 3 adapted for engagement with a working mechanism such as a gearbox or the like. Axle 3 is rotatably mounted within a housing 5 and rotatably communicates with means 7 for receiving an output shaft of an electrical motor. This is best illustrated in FIG. 3 of the drawings which illustrates the left side of the FIG. 1 view and illustrates the receiving-side of the apparatus. The means for receiving the rotatable shaft is a primary rotational surface within the housing 5.

Also mounted within the housing 5 is wheel 9 which has a surface adapted for frictional engagement with the primary rotational surface of means 7. As illustrated in FIG. 1 of the drawings, the surface of means 7 is knurled while the surface of wheel 9 is preferably formed of a highly frictional material such as a rubber.

Wheel 9 is mounted within housing 5 for biasing toward a position of non-engagement with means 7, but which may be resiliently and selectively positioned for frictional engagement with means 7.

It is thus seen in FIG. 1 that wheel 9 is mounted for rotation about an axle 11. Axle 11 is associated with a spiraling spring 13 along the axis of the axle for the biasing of said wheel toward a position of non-engagement but which permits resilient yielding to permit engagement between wheel 9 and means 7.

It is thus seen that wheel 9 is adapted for manual engagement with the palm of the hand such that by depressing wheel 9 against the biasing of spring 13 that wheel 9 engages means 7 and permits movement of the hand to affect rotation of wheel 9 and thus means 7 together with the associated electrical motor and associated working mechanism on either side thereof.

Preferably the apparatus of this invention is configured so as to conform to the standards set forth by the National Electrical Manufacturers Association (NEMA) as published in NEMA Motor Standards, 1969, which is herewith incorporated by reference. It is seen from the left side of FIG. 1 and in FIG. 3 that the receiving-side 21 of the apparatus 1 conforms to the standard C-faced configuration of a NEMA motor while shaft surface 23 reproduces the configuration of a C-faced motor. This permits associated mechanism designed for engagement with a C-faced motor to also engage the apparatus of this invention.

It is thus seen that the apparatus of this invention permits manual alignment of an electrical motor and its associated mechanism. It is additionally seen that the apparatus of this invention provides such an apparatus which may be made integral with an electrical motor or interposed between such electrical motor and its working mechanism. As many additional advantages and features will become apparent to those of skill in the art from a reading of the above description such variations are embedded within the spirit and scope of this invention as defined by the following appended claims.

What is claimed is:

1. A motor rotating apparatus comprising:
   a rotatable shaft having a longitudinal axis of rotation;
   means defining a housing about said rotatable shaft,
      means rotatably mounted within said housing for receiving an output shaft from an electrical motor, said means for receiving being in rotational communication with said rotatable shaft; and
   means partially mounted within said housing for selective rotational engagement with said means for receiving.

2. A motor rotating apparatus in accordance with claim 1 wherein said means for selective rotational engagement comprises:

an axle mounted within said housing;

a wheel mounted on said axle for selective frictional engagement with said means for receiving; means biasing said wheel toward a first position of non-engagement.

3. The apparatus according to claim 2 wherein said means biasing said wheel comprises a spiral spring associated with said axle, said spring spiraling along the axis of said axle and being deformable to permit said wheel to contact said means for receiving.

4. The apparatus according to claim 1 wherein said housing has a receiving-side wherein said means for receiving is accessible for receiving an output shaft from an electrical motor and a shaft-side wherein said rotatable shaft is accessible for working engagement and wherein said receiving side conforms to the configuration of a C-faced electrical motor and wherein said shaft-side has a configuration similar to the configuration of said C-faced motor such that apparatus adaptable for engagement with a C-faced motor are engageable with said motor rotating apparatus.

5. An apparatus for permitting manual selective engagement of one wheel surface with another comprising a housing;

a primary rotational surface within said housing; an axle mounted within said housing;

a wheel mounted on said axle for selective frictional engagement with said primary rotational means; and means biasing said wheel toward a first position non-engageable with said primary rotational means, but resiliently yieldable to permit such engagement.

* * * * *